United States Patent
Sato (10) Patent No.: US 7,460,269 B2
(45) Date of Patent: Dec. 2, 2008

(54) METHOD AND DEVICE FOR COLOR DATA GENERATION

(75) Inventor: Tatsuya Sato, Ichinomiya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1040 days.

(21) Appl. No.: 10/626,562

(22) Filed: Jul. 25, 2003

(65) Prior Publication Data

US 2004/0190091 A1 Sep. 30, 2004

(30) Foreign Application Priority Data

Jul. 26, 2002 (JP) ............................. 2002-218352

(51) Int. Cl.
*H04N 1/60* (2006.01)
(52) U.S. Cl. .................. 358/1.9; 358/518; 358/529; 382/167; 345/602
(58) Field of Classification Search ................. 358/518, 358/529, 523, 532, 3.26, 1.9, 3.23, 2.1; 382/167, 382/163; 345/602, 589
See application file for complete search history.

(56) References Cited

U.S. PATENT DOCUMENTS 6,466,332 B1 * 10/2002 Fukasawa ................... 358/1.9
2003/0072016 A1 * 4/2003 Dalrymple et al. ........... 358/1.9

FOREIGN PATENT DOCUMENTS

JP 4-281668 A 10/1992
JP 2686673 B2 8/1997

* cited by examiner

*Primary Examiner*—King Poon
*Assistant Examiner*—Jamares Washington
(74) *Attorney, Agent, or Firm*—Oliff & Berridge, PLC (57) ABSTRACT

A device and method is provided for generating color data for image formation by converting C, M, Y, data into C, M, Y, K data. The minimum value of the three color values of C, M, Y is selected and, depending on the color of the minimum value, a black data generating table is selected to generate a value for the black color K. The black data generating tables have different black data conversion characteristics from one another and are associated with the three colors of cyan, magenta, and yellow, respectively.

24 Claims, 5 Drawing Sheets

METHOD AND DEVICE FOR COLOR DATA GENERATION

BACKGROUND OF THE INVENTION

1. Field of the Invention

The present invention relates to a method and device of generating color data for color image formation by converting image data of three colors of cyan, magenta, and yellow, representing a color image to be formed, into color data for four colors including cyan, magenta, and yellow, and black.

2. Description of Related Art

Conventional color image forming devices such as printers and copy machines generally form color images on a recording paper using ink or toner of the four colors of cyan (C), magenta (M), yellow (Y), and black (K), In this image forming process, a computer or scanner, for example, inputs image data that includes color data for the three colors of red (R), green (G), and blue (3) into the color image forming device. The image forming device then converts this image data to image data of the three colors of cyan (C), magenta (M), and yellow (Y). The image forming device then converts a portion of or all overlapping portions in which the three-color data overlap into black (K) data, thereby generating four-color data for color image formation.

Figure 1:
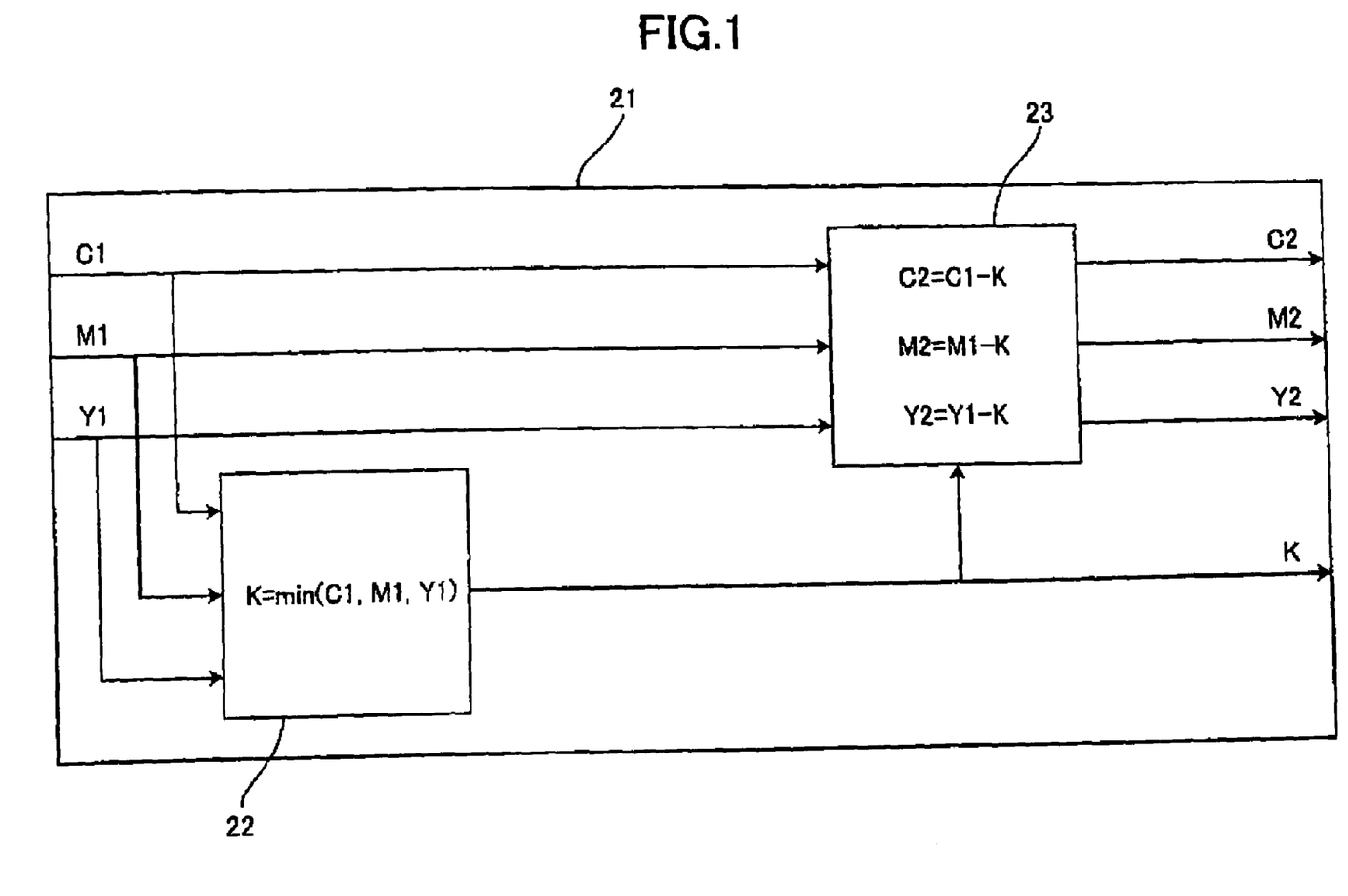
FIG. 1 is a functional block diagram of a conventional color data generating device.

For example, as shown in FIG. 1, a color data generating device 21 in this type of color image forming device can include a selecting unit 22 for selecting, as black data K, the minimum value among color data C1 (cyan), M1 (magenta), and Y1 (yellow); and a subtracter 23 for correcting each color data C1, M1, and Y1 by subtracting the black data K from each color data C1, M1, and Y1. The color data generating device 21 outputs the black data K, which is outputted from the selecting unit 22, and the color data C2, M2, and Y2 corrected by the subtracter 23 as the color data (C2, M2, Y2, K) for color image formation.

The generated color data C2, M2, Y2, and K is used to determine the amount of ink or toner for each color used in forming the color image.

SUMMARY OF THE INVENTION

However, the conventional color data generating device determines the black data K based on the minimum value of the three color values C1 (cyan), M1 (magenta), and Y1 (yellow), regardless of variations in the main color of the image. As a result, the black color can be depicted too heavily, causing light or weak images too appear messy, or too weakly, causing dark or strong images too lack sufficient contrast, thereby resulting in a decline in the quality of image reproduction-and the quality of the product.

For example, when the main color of the image is a light or weak color such as skin color, the black color stands out and appears overbearing. When the main color of the image is a dark Or strong color such as blue color, the black color can be submerged resulting in insufficient contrast in the image.

In view of the foregoing, it is an object of the present invention to provide a color data generating method and a color data generating device for generating color data for color image formation capable of forming images of high quality.

In order to attain the above and other objects, the present invention provides a method of generating color data for image formation in a color image forming device by converting data of color values for three colors of cyan, magenta, and yellow, representing a color image to be formed, into data of color values for four colors of cyan, magenta, yellow, and black, The method includes: preparing a plurality of black data generating tables which have different black data conversion characteristics from one another; receiving a set of color data including color values for three colors of cyan, magenta, and yellow; extracting a minimum value among the three color values in the received set of color data; selecting a black data generating table dependently on color of the extracted minimum value; and generating a value for black using the selected black data generating table and based on the extracted minimum value.

According to another aspect, the present invention provides a color data generating device, provided in a color image forming device, for generating color data for image formation by converting data of color values for three colors of cyan, magenta, and yellow, representing a color image to be formed, into data of color values for four colors of cyan, magenta, yellow, and black. The device includes: a table storage portion; an input portion; an extracting portion; a table selecting portion; and a black generating portion. The table storage portion stores a plurality of black data generating tables which have different black data conversion characteristics from one another. The input portion receives a set of color data including color values for three colors of cyan, magenta, and yellow. The extracting portion extracts a minimum value among the three color values in the received set of color data. The table selecting portion selects a black data generating table dependently on color of the extracted minimum value. The black generating portion generates a value for black using the selected black data generating table and based on the extracted minimum value.

BRIEF DESCRIPTION OF THE DRAWINGS

The above and other objects, features and advantages of the invention will become more apparent from reading the following description of the preferred embodiments taken in connection with the accompanying drawings in which.

DETAILED DESCRIPTION OF THE PREFERRED EMBODIMENT

A color data generating device according to a preferred embodiment of the present invention will be described while referring to the accompanying drawings wherein like parts and components are designated by the same reference numerals to avoid duplicating description.

Figure 2A:
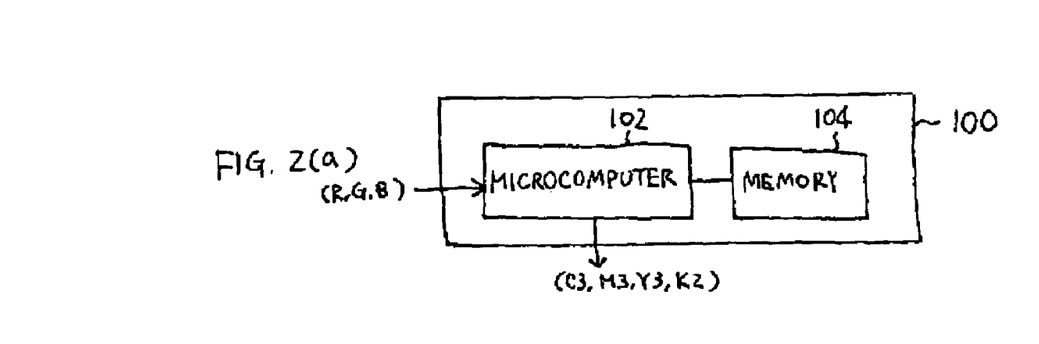
FIG. 2(a) is a block diagram showing the overall structure of a color data generating device according to a preferred embodiment of the present invention.

FIG. 2(a) shows the overall structure of a color data generating device 100 for image formation according to the preferred embodiment. The color data generating device 100 is disposed in a color image forming device (not shown) such as a printer or a copy machine.

The color data generating device 100 includes: a microcomputer 102 and a memory 104, such as ROM or RAM, which is connected to the microcomputer 102. A special logic circuit may be provided in place of the microcomputer 102.

Figure 2B:
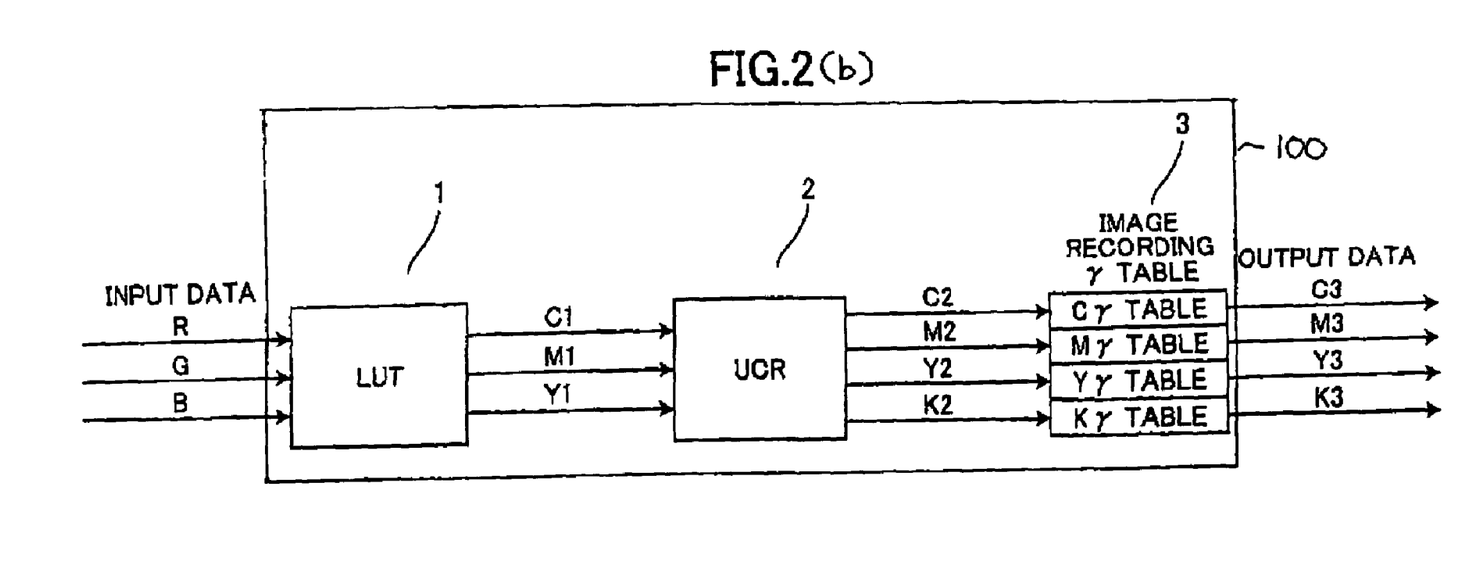
FIG. 2(b) is a functional block diagram of the color data generating device of FIG. 2(a)

A personal computer, scanner, or the like (not shown) supplies the color data generating device 100 with a set of image data (R, G, B) that is indicative of a color state of a pixel of an image and that has color data for the three colors of red (R), green (G), and blue (B). The color data generating device 100 converts this image data (R, G, B) to color data (C3, M3, Y3, K3) for image formation that includes the four colors of cyan (C3), magenta (M3), yellow (Y3), and black (K2), and subsequently outputs this color data (C3, M3, Y3, K2) to an image forming unit (not shown) in the color image forming device-As As shown in the functional block diagram of FIG. 2(*b*), the color data generating device 100 includes: a converting unit 1, a UCR (Under Color Rejection) processing unit 2, and an image recording γ table 3. The image recording γ table 3 is configured in the memory 104. The converting unit 1 and the UCR processing unit 2 are implemented through a computational process executed by the microcomputer 102 by using the memory 104.

The converting unit 1 uses a preset lookup table (LUT), which is stored in the memory 104, to convert RGB image data (R. G, B) representing a color pixel into a set of three-color data (C1, M1, Y1) for cyan, magenta, and yellow that have a complementary color relationship with the RGB image data.

The UCR processing unit 2 converts the three-color data set (C1, M1, Y1) into a set of four-color data (C2, MS, Y2, K1) for cyan, magenta, yellow and black in a manner according to the present embodiment.

The image recording γ table 3 is used to convert the four-color data set (C2, M2, Y2 K1) into another four-color data set (C3, M3, Y3, K2) for cyan, magenta, yellow, and black in order to adjust image characteristics such as brightness values and reflection density values for printing on a recording medium. Receiving the color data set (C3, M3, Y3, K2), the image forming unit in the image forming device (not shown) forms a color image on a recording medium by ejecting ink of the four colors in amounts that are determined based on the four-color data C3, M3, Y3, and K2.

Next, the construction and operations of the UCR processing unit 2 will be described with reference to FIGS. 3 and 4.

Figure 3:
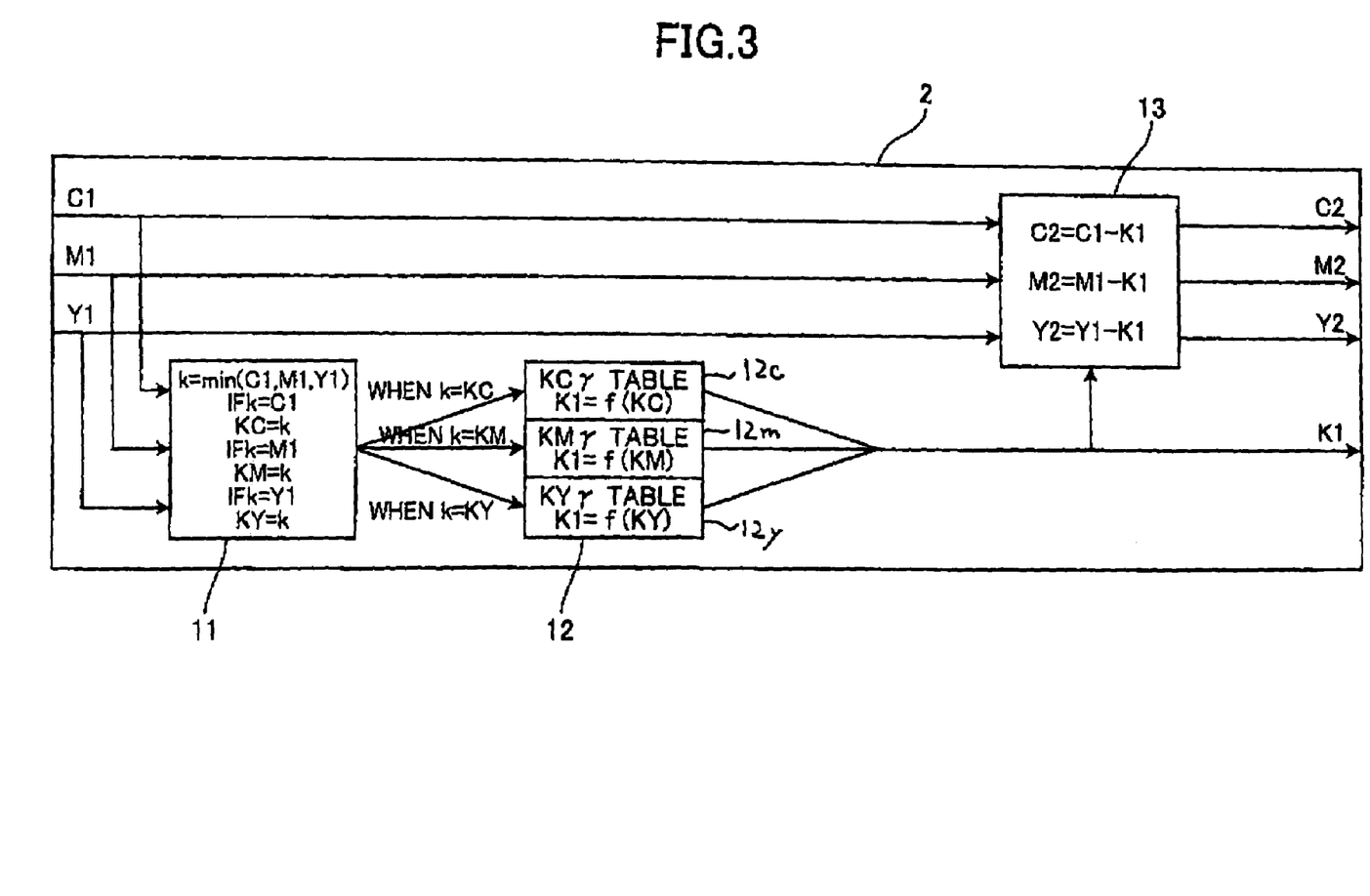
FIG. 3 is a functional block diagram showing the operations of the UCR processing unit 2.

FIG. 3 represents the function blocks of the UCR processing unit 2.

As shown in FIG. 3, the UCR processing unit 2 includes: a selecting unit 11, a storing unit 12, and a correcting unit 13. The storing unit 12 is configured in the memory 104. The selecting unit 11 and the correcting unit 13 are implemented through a computational process of FIG. 4 executed by the microcomputer 102.

The storing unit 12 stores three types of black data generating tables, that is, a KCγ table 12*c*, a KMγ table 12 m, and a KYγ table 12γ. The KCγ table 12*c* is used for generating black data K1 based on color data C1 inputted from the converting unit 1. The KMγ table 12 m is used for generating black data K1 based on the color data M1 inputted from the converting unit 1. The KYγ table 12*y* is used for generating black data K1 based on the color data Y1 inputted from the converting unit 1.

The selecting unit 11 extracts a minimum value k from among the three values C1, M1, and Y1 in the color data set (C1, M1, Y1) indicative of one pixel inputted from the converting unit 1, That is, k= min (C1, M1, Y1). If the minimum value k is color data C1 (k =C1), then the KCγ table 12*c* is selected for generating black data K2. If the minimum value k is color data M1 (k =M1) then the KMγ table 12*m* is selected for generating black data K1. If the minimum value k is color data Y1 (k =Y1), then the KYγ table 12*y* is selected for generating black data K1. The black data K1 is generated using the selected table 12*c*, 12*m*, or 12*y*.

The correcting unit 13 corrects each color data C1, M1, and Y1 by subtracting the generated black data K1 from each color data C1, M1, and Y1. Color data C2 (C1-K1), M2 (M1-R1) and Y2 (Y1-K1) obtained through the correction by the correcting unit 13, and the black data K1 generated by using one of the KCγ table 12*c*, KMγ table 12*m*, or KYγ table 12*y* are outputted as a set of image data (C2, M2, Y2, K1) to the image recording 1 table 3 (FIG. 2 (b)).

Next, steps in the computational process executed by the microcomputer 102 for implementing the functions of the selecting unit 11 and the correcting unit 13 will be described with reference to the flowchart of FIG. 4.

Figure 4:
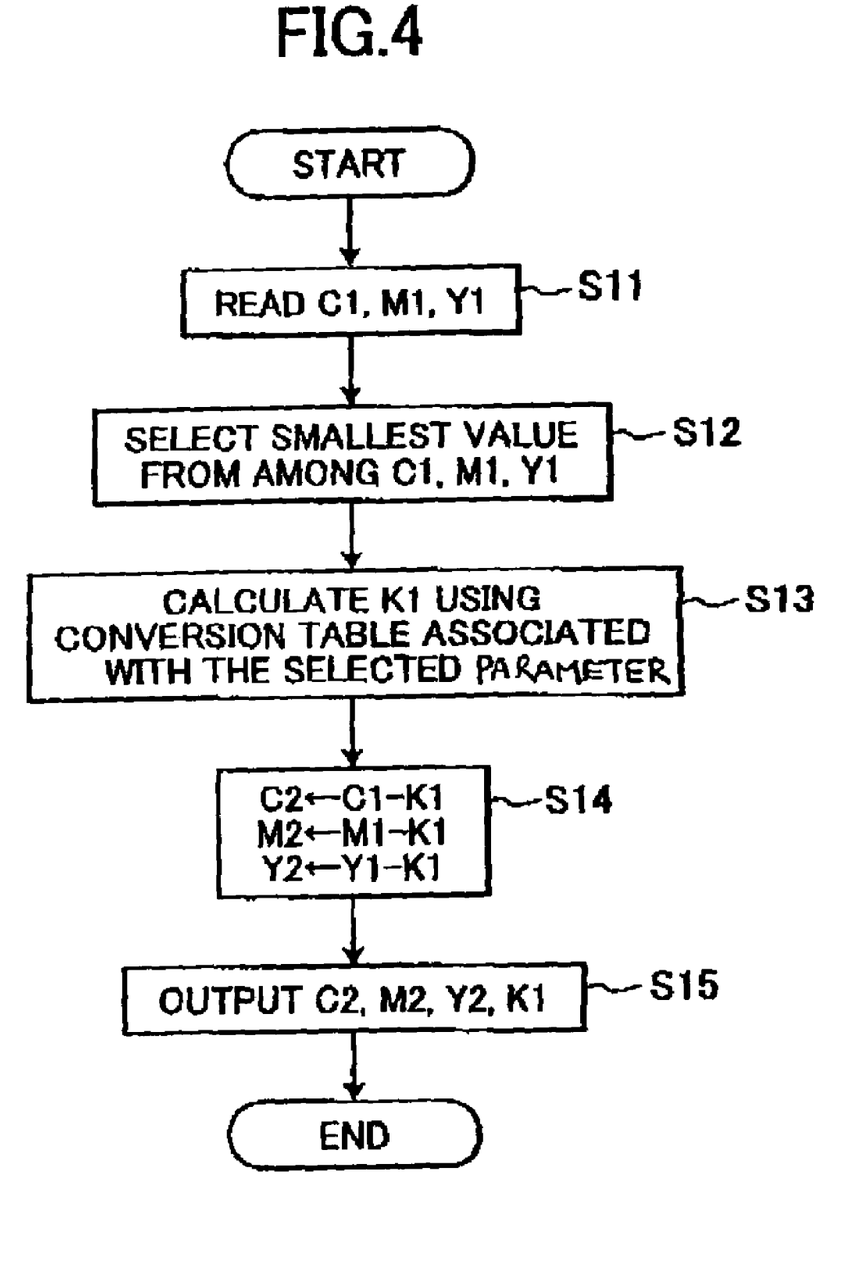
FIG. 4 is a flowchart showing the operations of the UCR processing unit 2.

As shown in FIG. 4, the UCR processing unit 2 reads one set of color data (C1, M1, Y1) from the converting unit 1 in S11 The color data (C1, M1, Y1) represents a pixel in a color image to be formed by the image forming device (not shown) in which the color data generating device 100 is incorporated.

In S12, the UCR processing unit 2 extracts the smallest value k from among the color values C1, M1, and Y1 in the data set (C1, M1, Y1) that is read in S11. Color data C1, M1, or Y1 that corresponds to the minimum value k is selected as a parameter for choosing one of the KCγ table 12*c*, KM table 12*m*, and KYγ table 12*y*.

In S13 one of the KCγ table 12*c*, the KMγ table 12*m*, and the KYγ table 12*y* that corresponds to the parameter K1, M1, or Y1 selected in 512 is chosen as a black data generating table to be used for the present pixel. Then, the selected black data generating table 12*c*, 12*m*, or 12*y* is referred to, and a black value K1 that corresponds to the parameter C1, M1, or Y1 is selected from the selected black data generating table 12*c*, 12*m*, or 12*y*.

After generating the black data K1 in 513, corrected color data C2, M2, and Y2 are calculated in S14 by subtracting this black data K1 from the color data C1, M1, and Y1, respectively. That is, in S13, the following equations are calculated:

$$C2=C1-K1,$$

$$M2=M1-K1,$$

$$Y2=Y1-K1.$$

In S15 the values C2, M2, and Y2 calculated in 514 and the black value K1 calculated in S13 are outputted together as a set of image data (C2, M2, Y2, K1) to the image recording γ table 3, and the process for the subject pixel ends.

Next, the KCγ table 12*c*, the FMr table 12*m*, and the KYγ table 12*y* will be described with reference to FIGS. 5(*a*)-5(*c*).

It is noted that when cyan data C1 is selected in S12 as the minimum value among the three color data C1, M1, and Y1 in the received data set (C1, M1, Y1) depicting one pixel, then it is known that the main color of this pixel is a combination of yellow and magenta, and therefore that this pixel represents a light or weak color such as a skin color or the like. It is noted that black color tends to stand out on light- or weak-color images and therefore that color images that have yellow and magenta combination as their main color are likely to appear cluttered. The KCγ table 12*c* is prepared to cope with such images that have yellow and magenta as their main color. The KCγ table 12c is selected in S13 when the minimum value k in the inputted color data set (C1, M1, Y1) is the value C1 (cyan).

When yellow data Y1 is selected as the minimum value in the received color data set (C1, M1, Y1), then it is known that the main color of this pixel is a combination of cyan and magenta, and therefore that this pixel represents dark or strong color such as blue, burgundy (reddish-purple), or the like. It is noted that color images having cyan and magenta combination as their main color have such characteristics that black color tends to be lost in the main color, resulting in the color images lacking sufficient contrast. The KCY table 12y is prepared to cope with such images that have cyan and magenta as their main color. The KYγ table 12γ is selected in S13 when the minimum value k in the inputted color data set (C1, M1, Y1) is Y1 (yellow).

When magenta data M1 is selected as the minimum value in the received color data set (C1, M1, Y1), then it is known that the main color of this pixel is a combination of cyan and yellows and therefore that this pixel represents medium-dark or medium-strong color such as green or the like. It is noted that color images having cyan-and-yellow combination as their main color have characteristics intermediate between the color images having yellow-and-magenta combination as their main color and the color images having cyan-and-magenta combination as their main color. The KMγ table 12m is prepared to cope with such images that have cyan and yellow as their main colors. The K table 12m is selected in 513 when the minimum value k in the inputted color data set (C1, M1, Y1) is M1 (magenta).

Figure 5A:
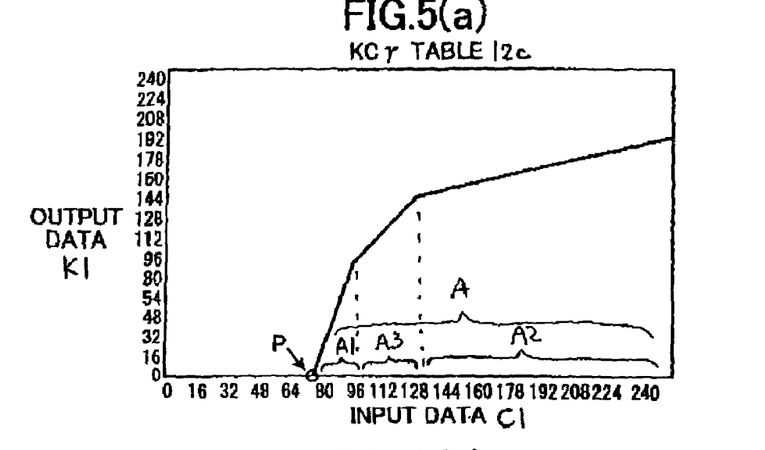
FIG. 5(a) is a graph showing the conversion characteristics of a KCγ table 12c.

FIG. 5(a) is a graph showing the conversion characteristics of the KCγ table 12c. In FIG. 5(a), the horizontal axis represents the value of the-inputted-color data C1 (minimum value k) serving as the target of conversion, while the vertical axis represents the value of black data K1 that is to be outputted through the conversion. Each of these data values represents a color value in a 256-gradation range.

Figure 5B:
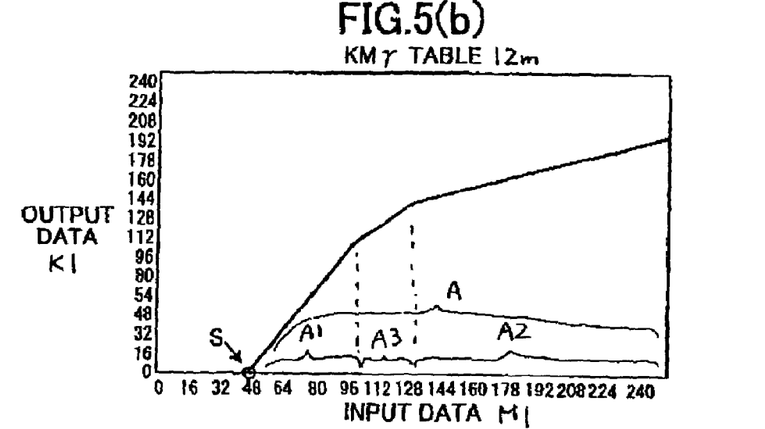
FIG. 5(b) is a graph showing the conversion characteristics of a KMγ table 12 m.

FIG. 5(b) is a graph showing the conversion characteristics of the KM table 12m. In FIG. 5(b), the horizontal axis represents the value of the inputted color data M1 (minimum value k) serving as the target of conversion, while the vertical axis represents the value of black data K1 that is to be outputted through the conversion. Each of these data values represents a color value in a 256-gradation range.

Figure 5C:
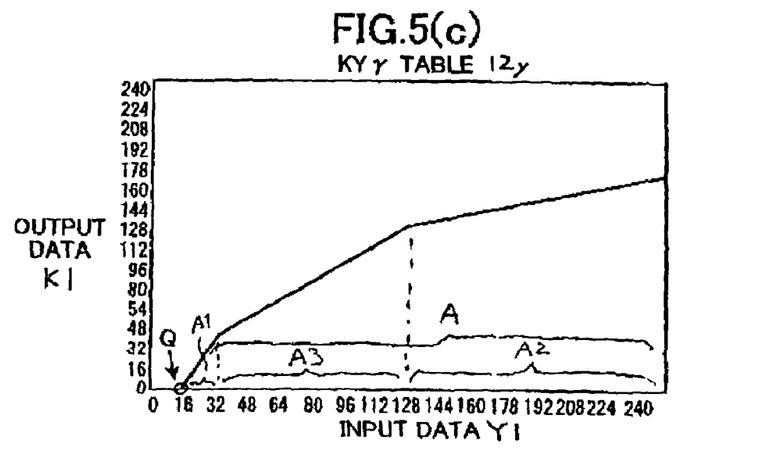
FIG. 5(c) is a graph showing the conversion characteristics of a KYγ table 12y.

FIG. 5(c) is a graph showing the conversion characteristics of the KYγ table 12k. In FIG. 5(c), the horizontal axis represents the value of the inputted color data Y1 (minimum value k) serving as the target of conversion, while the vertical axis represents the value of black data K1 that is to be outputted through the conversion. Each of these data values represents a color value in a 256-gradation range.

As shown in FIG. 5(a), the KCγ table 12c is configured to not generate the black data K1 when the input color data C1 is less than or equal to a first prescribed limit value P. As shown in FIG. 5(c), the KYγ table 12y is configured to-not generate the black data K1 when the input color data Y1 is less than or equal to a second prescribed limit value Q that is less than the first prescribed limit value P. As shown in FIG. 5(b), the KMγ table 12m is configured to not generate the black data K1 when the input color data M1 is less than or equal to a third prescribed limit value S that is between the first limit value P and the second limit value Q. It is noted, however, that depending on the type of recording medium to be used and a desired image to be printed, the third limit value S can be set closer to the first limit value P, closer to the second limit value 0, or equivalent to either the first limit value P or second limit value Q.

These limit values P, S, and Q are set because if black data K1 of greater than zero were generated when the minimum value k of the color data set (C1, M1, Y1) is less than the corresponding limit value P, S, or Q, the black color would appear extremely harsh, thereby greatly degrading the color hue appearance of the image. By generating black data K1 of zero when the minimum value k of the color data (C1, M1, Y1) is less than or equal to the corresponding limit value P, S, or Q, it is possible to form a high-quality color image without degrading the color hue appearance of the image.

As shown in FIGS. 5(a)-5(c), in each of the KCγ table 12c, KMγ table 12m, and KYγ table 12y, the graph curve indicative of the correspondence between input data C1, M1, and Y1 (minimum value k) and output data K1 has such characteristics that the value of the black data K1 increases as the corresponding value C1, M1, or Y1 increases in a range A, which is defined between its limit value P, S, or Q and a predetermined maximum value 255 in the 256-gradation range. Accordingly, the appropriate value of black data K1 can be generated according to variations in the density of the minimum value k of C1 (cyan), M1 (magenta), or Y1 (yellow).

It is noted, however, that the KCγ table 12c, KMγ table 12m, and KYγ table 12y have different graph curves from one another. In this way, it is possible to generate black data K1 of values that can appropriately adjust the image contrast and image quality according to the main color of the image.

It is noted that even when input color data C1, M1, or Y1 is larger than the corresponding limit value P, S, or Q, the image quality will still be affected by the value of black data K1 when the input color data C1, M1, or Y1 is a relatively small value. Accordingly, each graph curve is set so that while the input value C1, M1, or Y1 has a relatively small value in the range A, the value of the black data X1 changes effectively at a relatively high changing rate, in accordance with the change in the corresponding input value C1, M1, or Y1, in a corresponding specific manner that is determined dependent on the corresponding main color. More specifically, the range A greater than the limit value F, S, or Q has a first range A1 near to the limit value P, S, or Q; a second range A2 near to the maximum value 255; and a third range A3 intermediate between the ranges A1 and A2. In the range A1, the value of the black data K1 changes effectively at a relatively high changing rate, in accordance with change in the corresponding input value C1, M1, or Y1, in a corresponding specific manner.

It is also noted that when the input data C1, M1, or Y1 becomes near to the maximum value 255, the total amount of ink for the three colors C1, M1, and Y1 will increase Accordingly, these graph curves are set to control the overall amount of ink used. That is, the rate of change in the graph curve decreases as the color data value C1, M1, or Y1 increases toward the predetermined maximum value 255. In other words, each graph curve is set so that the rate of change in the curve in the range A2 is smaller than the rate of change in the curve in the range A1. In this example, each graph curve is set so that the rate of change in the curve in the range A2 is smaller than the rate of change in the curve in the range A3, and the rate of change in the curve in the range A3 is smaller than the rate of change in the curve in the range A1.

Accordingly, even when the input data C1, M1, or Y1 approaches 255, the output data K1 will become 200 or less. In this way, it is possible to reduce the amount of ink for the black data K2, while maintaining gradation by allowing the black data K1 to increase as the input data C1, M1, or Y1 increases. Hence, conversion to the black data K1 using the tables 12c, 12m, or 12y can control the overall amount of ink to be ejected onto the recording medium, thereby forming images on the recording medium that are not sticky. Ink ejected onto the recording medium dries quickly.

As described above, when color image data (C1, M1, Y1) representing a color image is read in S11, the minimum value from among the color values C1, M1, and Y1 is selected in S12. Next, in S13, black data K1 is generated using a black data generating table 12c, 12m, or 12y that corresponds to the color of the minimum value k =min (C1, M1, Y1) determined in S11. The black data generating tables 12c, 12m, and 12y have different black data conversion characteristics from one another and are associated with the three colors of cyan, magenta, and yellow, respectively. In S14, the black data K1 obtained in S13 is subtracted from each of the color data C1, M1, and Y1 to obtain corrected color data C2, M2, and Y2. In 515, the data C2, M2, and Y2 are outputted along with the black data K1 as four-color data (C2, M2, Y2, K1). Accordingly, it is possible to form images of high quality, even when the main colors of the images change, by preventing light- or weak-color images from appearing messy due to the black color being depicted too strongly and by preventing dark- or strong-color images from lacking sufficient contrast due to the black color being depicted too weakly.

As described above, with the color data generating device 100 according to the preferred embodiment and having the construction described above, the black data generating table 12c, 12m, or 12y that is suited to the main color of the input image can be selected in S12 and S13. Accordingly, high-quality images with good reproduction can be always formed, even when the main colors of the color images change. That is, it is possible to-prevent the representation of the black color from being too harsh and making light- or weak-color images appear messy. It is also possible to prevent the representation of the black color from being too weak and providing insufficient contrast in dark- or strong-color images.

As described above, the main color of an image is determined by color data for two colors that is obtained by excluding the color data k=min (C1, M1, Y1) having the minimum value from among the three-color data C1, M1, and Y1. According to the present embodiment, the black data generating table 12c, 12m, and 12y, each of which is associated with corresponding color data k=min (C1, M1, Y1) having the minimum value, is configured to determine an output value of the black data K1 that is suited to the main color of the image and that can adjust the image contrast and image quality suitably. Hence, by selecting a black data generating table 12c, 12m, or 12y in association with the minimum value k=min (C1, M1, Y1), it is possible to select a black data generating table 12c, 12m, or 12y that is suited to the main color of the color image.

For example, when the cyan color data C1 is the smallest among the color data values C1, M1, and Y1, then the main color of the pixel is represented mostly by yellow and magenta. Accordingly, if black data of greater than zero were generated when the color data C1 is less than or equal to the first limit value P, then the black will clutter a resultant image and will degrade the color hue appearance. Hence, according to the present embodiment, by preparing the table 12c of FIG. 5(a) in which black data K1 of zero will be generated when color value C1 is smaller than or equal to the first limit value P, and by selecting the table 12c when the cyan color data C1 is the minimum value k=min (C1, M1, Y1), it is possible to prevent black data K1 of greater than zero from being generated when the input value C1 is less than or equal to the first limit value P and therefore the input pixel has primarily yellow and magenta. Accordingly, a high-quality image can be formed without cluttering the image or degrading the color hue appearances.

When the yellow color data Y1 is the minimum value among the color data C1, M1, and Y1, the main color of the pixel is represented by cyan and magenta. It is noted that when color in a color image formed primarily of cyan and magenta is light or weak, black can clutter the color image and degrade its color hue if black data of greater than zero were generated when the color data Y1 is less than or equal to the second limit value Q. Hence, according to the present embodiment, by preparing the table 12y of FIG. 5(c) in which black data K1 of zero will be generated when color value Y1 is smaller than or equal to the second limit value S5 Q, and by selecting the table 12y when the yellow color data Y1 is the minimum value k=min (C1, M1, Y1), black data of greater than zero will not be generated when the input value Y1 is less than or equal to the second limit value Q and is indicative of a color image formed primarily of cyan and magenta. Therefore, a high-quality image can be formed without cluttering the image or degrading the color hue appearances.

Black is less noticeable in color images formed primarily of cyan and magenta than in color images formed primarily of yellow and magenta. Therefore, the second limit value Q is set smaller than the first limit value P. It is possible to generate black data of greater than zero even when color data Y1 is smaller than the first limit P if the color data Y1 is greater than the second limit Q It is therefore possible to improve the contrast in color images and to expand the range of color density control.

Further, since the amount of black data K1 generated is subtracted from the C1, M1, and Y1 color data, images that are not sticky can be formed on the recording medium by controlling the amount of total ink ejected thereon.

Further, color images of a high quality can be formed without the images appearing cluttered or degrading their color hue appearance, even when the color data for the three colors C1, M1, and Y1 are small and form light or weak colors.

By providing the three tables 12c, 12m, and 12y having a one-on-one correspondence with the three colors of cyan, magenta, and yellow, it is possible to generate black data K1 by selecting one of the tables 12c, 12m, and 12y that is suited to the main color of the image, which is dependent on the variations in the combinations of the densities of the three colors, thereby forming images of high quality with good reproduction.

While the invention has been described in detail with reference to the specific embodiment thereof, it would be apparent to those skilled in the art that many modifications and variations may be made therein without departing from the spirit of the invention, the scope of which is defined by the attached claims.

For example, in the embodiment described above, the three types of tables 12c, 12m, and 12y having different conversion characteristics, shown in FIGS. 5(a)-5(c), are selectively used as a black data generating table for converting the minimum value of the inputted data C1, M1, and Y1 into black data K1. However, the conversion characteristics of these tables 12c, 12m, and 12y are not limited to the characteristics shown in FIGS. 5(a)-5(c), provided that the tables 12c, 12m, and 12y are associated with the color data C1, M1, and Y1 to prevent the representation of the black color K1 from being too strong relative to light- or weak-color images and making the images feel cluttered and to prevent the representation of the black color KB from being-too weak relative to dark- or strong-color images and giving the images insufficient contrast.

Further, it is unnecessary to prepare three black data generating tables 12c, 12m, and 12y corresponding to all of the three types of color data C1, M1, and Y1. For example, it is possible to prepare only the two tables: KCγ table 12c and KYγ table 12y. In this case, when the minimum value among the input values C1, M1, and Y1 is M1 in S12, one of the KCγ table 12c and KYγ table 12y is selectively used in place of the KMγ table 12m. This is because an image having magenta value M1 as the minimum value k min (C1, M1, Y1) has characteristics intermediate between the characteristics of another image having cyan value C1 as the minimum value k=min (C1, M1, Y1) and still another image having yellow value Y1 as the minimum value k=min (C1, M1, Y1). In this modification, it is preferred that which one of the tables 12c and 12y is used in correspondence with the minimum value M1 is determined as fixed in advance. The memory 104 is stored with data indicative of the fixed one of the tables 12c and 12y to be used in correspondence with the minimum value M1. This ensures that the previously-determined, same table 12c or 12y will be used in S13 every time when the minimum value is determined as M1 in S12. It is possible to continuously form images of high quality with good reproduction.

What is claimed is:

1. A method of generating color data for image formation in a color image forming device by converting data of color values for three colors of cyan, magenta, and yellow, representing a color image to be formed, into data of color values for four colors of cyan, magenta, yellow, and black, the method comprising:
   preparing a plurality of black data generating tables which have different black data conversion characteristics from one another;
   receiving a set of color data including color values for three colors of cyan, magenta, and yellow;
   extracting a minimum value among the three color values in the received set of color data;
   selecting only one black data generating table dependently on color of the extracted minimum value irrespective of whether the three color values in the received set of color data are different from one another; and
   generating a value for black using the selected black data generating table and based on the extracted minimum value.

2. A method according to claim 1, further comprising the step of correcting the color values for cyan, magenta, and yellow in the received color data set by subtracting the generated value for black from the three values for cyan, magenta, and yellow, respectively.

3. A method according to claim 1, wherein the plurality of black data generating tables include three different tables, each having a one-on-one correspondence with one of cyan, magenta, and yellow.

4. A method according to claim 3, wherein each of the three black data generating tables is configured to allow the value for black to increase as the value of a corresponding color value increases and to allow the rate of change for the value for black to decrease as the value of the corresponding color value approaches a predetermined maximum.

5. A method according to claim 1, wherein the black data generating tables include two tables associated with cyan and yellow, and the table selecting process selects one of the two tables when the extracted minimum value is for magenta.

6. A method according to claim 5, further comprising a step of previously determining one of the two tables that is to be selected for magenta.

7. A method according to claim 1, wherein one of the plurality of black data generating tables is a first table configured to allow the black data generating step to generate a value or zero for black when the value of the corresponding color is less than or equal to a first prescribed limit value.

8. A method according to claim 7, wherein another one of the plurality of black data generating tables is a second table configured to allow the black data generating step to generate a value or zero for black when the value of the corresponding color is less than or equal to a second prescribed value that is smaller than the first prescribed limit value.

9. A method according to claim 7, wherein the first table is a black data generating table for cyan that is selected when the extracted minimum value is for cyan.

10. A method according to claim 8, wherein the second table is a black data generating table for yellow that is selected when the extracted minimum value is for yellow.

11. A color data generating device, provided in a color image forming device, for generating color data for image formation by converting data of color values for three colors of cyan, magenta, and yellow, representing a color image to be formed, into data of color values for four colors of cyan, magenta, yellow, and black, the device comprising:
    a table storage portion storing a plurality of black data generating tables which have different black data conversion characteristics from one another;
    an input portion receiving a set of color data including color values for three colors of cyan, magenta, and yellow;
    an extracting portion extracting a minimum value among the three color values in the received set of color data;
    a table selecting portion selecting only one black data generating table dependently on color of the extracted minimum value irrespective of whether the three color values in the received set of color data are different from one another; and
    a black generating portion generating a value for black using the selected black data generating table and based on the extracted minimum value.

12. A color data generating device according to claim 11, further comprising a correcting portion correcting the color values for cyan, magenta, and yellow in the received color data set by subtracting the generated value for black from the three values for cyan, magenta, and yellow, respectively.

13. A color data generating device according to claim 11, wherein the plurality of black data generating tables include three different tables, each having a one-on-one correspondence with one of cyan, magenta, and yellow.

14. A color data generating device according to claim 13, wherein each of the three black data generating tables is configured to allow the value for black to increase as the value of a corresponding color value increases and to allow the rate of change for the value for black to decrease as the value of the corresponding color value approaches a predetermined maximum.

15. A color data generating device according to claim 11, wherein the black data generating tables include two tables associated with cyan and yellow, and the table selecting portion selects one of the two tables when the extracted minimum value is for magenta.

16. A color data generating device according to claim 15, further comprising a memory previously set with data indicative of one of the two tables that is to be selected for magenta by the table selecting portion.

17. A color data generating device according to claim 11, wherein one of the plurality of black data generating tables is a first table configured to allow the black data generating portion to generate a value or zero for black when the value of the corresponding color is less than or equal to a first prescribed limit value.

18. A color data generating device according to claim 17, wherein another one of the plurality of black data generating tables is a second table configured to allow the black data generating portion to generate a value or zero for black when the value of the corresponding color is less than or equal to a second prescribed value that is smaller than the first prescribed limit value.

19. A color data generating device according to claim 17, wherein the first table is a black data generating table for cyan that is selected by the table selecting portion when the extracted minimum value is for cyan.

20. A color data generating device according to claim 18, wherein the second table is a black data generating table for yellow that is selected by the table selecting portion when the extracted minimum value is for yellow.

21. A method of generating color data for image formation in a color image forming device by converting data of color values for three colors of cyan, magenta, and yellow, representing a color image to be formed, into data of color values for four colors of cyan, magenta, yellow, and black, the method comprising:
  preparing a plurality of black data generating tables which have different black data conversion characteristics from one another;
  receiving a set of color data including color values for three colors of cyan, magenta, and yellow;
  extracting a minimum value among the three color values in the received set of color data;
  selecting only one black data generating table dependently on color of the extracted minimum value irrespective of whether the three color values in the received set of color data are different from one another;
  generating a value for black using the selected black data generating table and based on the extracted minimum value; and
  correcting the color values for cyan, magenta, and yellow in the received color data set by subtracting the generated value for black from the three values for cyan, magenta, and yellow, respectively.

22. A method according to claim 21, wherein the preparing the plurality of black data generating tables prepares at least two black data generating tables which are for at least two colors among three colors of cyan, magenta, and yellow, and which have different black data conversion characteristics from one another, each black data generating table indicating corresponding black data conversion characteristics, in which an output black data value varies in accordance with change of an input value of a corresponding color;
  wherein the selecting selects, from among the at least two black data generating tables, a black data generating table dependently on color of the extracted minimum value; and
  wherein the generating generates the value for black using the selected black data generating table and based on the extracted minimum value.

23. A color data generating device, provided in a color image forming device, for generating color data for image formation by converting data of color values for three colors of cyan, magenta, and yellow, representing a color image to be formed, into data of color values for four colors of cyan, magenta, yellow, and black, the device comprising:
  a table storage portion storing a plurality of black data generating tables which have different black data conversion characteristics from one another;
  an input portion receiving a set of color data including color values for three colors of cyan, magenta, and yellow;
  an extracting portion extracting a minimum value among the three color values in the received set of color data;
  a table selecting portion selecting only one black data generating table dependently on color of the extracted minimum value irrespective of whether the three color values in the received set of color data are different from one another;
  a black generating portion generating a value for black using the selected black data generating table and based on the extracted minimum value; and
  a correcting portion correcting the color values for cyan, magenta, and yellow in the received color data set by subtracting the generated value for black from the three values for cyan, magenta, and yellow, respectively.

24. A color data generating device according to claim 23, wherein the table storage portion stores at least two black data generating tables which are for at least two colors among three colors of cyan, magenta, and yellow, and which have different black data conversion characteristics from one another, each black data generating table indicating corresponding black data conversion characteristics, in which an output black data value varies in accordance with change of an input value of a corresponding color;
  wherein the table selecting portion selects, from among the at least two black data generating tables, a black data generating table dependently on color of the extracted minimum value; and
  wherein the black generating portion generates the value for black using the selected black data generating table and based on the extracted minimum value.

* * * * *